United States Patent [19]

Shoshan

[11] 4,229,710
[45] Oct. 21, 1980

[54] WAVELENGTH SELECTOR FOR TUNABLE LASER

[76] Inventor: Itamar Shoshan, 7 Maimon St., Haifa, Israel, 32584

[21] Appl. No.: 921,830

[22] Filed: Jul. 3, 1978

[30] Foreign Application Priority Data

Oct. 21, 1977 [GB] United Kingdom ............... 44006/77

[51] Int. Cl.³ .................................................. H01S 3/08
[52] U.S. Cl. .......................... 331/94.5 C; 350/162 R; 350/168
[58] Field of Search ..................... 331/94.5 C, 94.5 D, 331/94.5 L; 350/168, 162 R

[56] References Cited

U.S. PATENT DOCUMENTS

| 3,684,979 | 8/1972 | Myer et al. ..................... 331/94.5 L |
| 3,691,477 | 9/1972 | Janney ............................ 331/94.5 C |

OTHER PUBLICATIONS

Shosham et al., Narrowband Operation of a Pulsed Dye Laser Without Intracavity Beam Expansion, J. Appl. Phys., vol. 48, No. 11, (Nov. 1977), pp. 4495–4497.
Brannen et al., Far-Infrared Laser Action Using Compound Grating Fabry-Perot Resonators, IEEE J. Quant. Electr., (Feb. 1970), pp. 138–139.

*Primary Examiner*—William L. Sikes
*Attorney, Agent, or Firm*—Browdy and Neimark

[57] ABSTRACT

A wavelength selector for use in a laser cavity comprising a diffraction grating mounted at an angle near grazing incidence with respect to the beam travelling away from the excited medium and a reflector which reflects the beam diffracted by the grating back along its incidence path. Wavelength tuning is accomplished by rorating this reflector, while the grating remains fixed. Rotation of the grating provides linewidth variation.

15 Claims, 5 Drawing Figures

WAVELENGTH SELECTOR FOR TUNABLE LASER

FIELD OF THE INVENTION

The present invention relates generally to a new improvement in mounting a diffraction grating in optical systems, and more particularly to the applicability of this improvement for use in a laser cavity. The invention is envisaged as being applicable to dye lasers, high-pressure gas lasers, semiconductor diode lasers, and in general any type of laser which may be frequency-tuned by an external cavity. It is also applicable, mutatis mutandis, for use in spectrometers and parametric devices.

BACKGROUND OF THE INVENTION

A diffraction grating, when used in a laser cavity as a wavelength selecting device, is usually mounted in the cavity in a Littrow mounting in which the beam diffracted by the grating is collinear with the incident beam. The grating mounted in the cavity provides a wavelength selective feedback which stimulates, in the excited medium of the laser, emission of radiation at the desired wavelength.

The spectral bandwidth of the output laser beam is determined by the passive bandwidth (single-pass bandwidth) of the cavity and the number of light passes in the cavity during the optical pumping of the active medium. A laser cavity defined by a Littrow-mounted grating on one side and a reflector on the other side has a passive bandwidth given by $$\delta\lambda = \frac{2\delta\theta}{(d\theta/d\lambda)} \quad (1)$$

where $\delta\theta$ is the half angle divergence of the beam incident on the grating, and $d\delta/d\lambda$ is the angular dispersion of the beam returning from the grating towards the excited medium. This angular dispersion is given in *Principles of Optics* by M. Born and E. Wolf (Pergamon Press, Oxford, 1975) as $$\frac{d\theta}{d\lambda} = \frac{m}{a\cos\theta} = \frac{2\tan\theta}{\lambda} \quad (2)$$

where m is the diffraction order, a is the groove-spacing of the grating and $\theta$ is the angle between the diffracted beam (which, in this case, is collinear with the incident beam) and the normal to the grating surface.

The highest wavelength selectivity obtainable with a given grating is achieved when all of its grooves are illuminated by a diffraction limited beam. In many lasers the beam travelling inside the cavity is very narrow so that only a small portion of the grating is illuminated; as a result, the linewidth of the output laser beam is large. The method commonly used to reduce the passive bandwidth of the cavity and thereby improve the laser linewidth is to expand the beam incident on the grating. In this way, the divergence $\delta\theta$ is reduced and the number of illuminated grooves on the grating is increased. The most widely used method of intracavity beam expansion is with the aid of a lens-telescope as in the dye laser described by Hänsch in *Applied Optics*, volume 11, page 895 (1972), or in the $CO_2$ laser described by Bagratashvili et al in *Optics Communications*, volume 9, page 135 (1973). The selectivity of the cavity is thus improved, and a narrower linewidth is obtained; but the use of a lens-telescope inside the cavity has disadvantages including the following:

1. The laser efficiency is reduced due to losses caused by undesirable reflections from the lenses.
2. The alignment of the telescope in the cavity is difficult.
3. The telescope needs focusing from time to time.
4. The beam quality is poor because of the need for using, in the cavity, lenses having a small radius of curvature.
5. The telescope adds significantly to the cavity's length.
6. The telescope has a fixed magnification, so that bandwidth variation is not possible.
7. The illumination of a large area on the grating's surface requires an extremely precise rotatory mechanism for keeping the grating grooves orthogonal to the laser axis as the grating rotates.
8. The high quality telescope required is very expensive.

In order to overcome these difficulties, considerable effort has been expended in replacing the lens-telescope by other types of beam expanders. Two dye lasers with a prism-expander in the cavity are described in the works of Stokes et al in *Optics Communications*, volume 5, page 267 (1972) and Hanna et al in *Optical and Quantum Electronics*, volume 7, page 115 (1975). A $CO_2$ laser with a similar prism-expander is also reported by Alcock et al in *Applied Physics Letters*, volume 23, page 562 (1973). Another dye laser with a mirror-telescope in the cavity is reported by Eesley and Levenson in *IEEE Journal of Quantum Electronics* QE-12, page 440 (1976). A multiple-prism-expander for use in a dye laser cavity is reported by Novikov and Tertyshnik in *Soviet Journal of Quantum Electronics*, volume 5, page 848 (1975) [Kvant. Elektron. (Moscow) volume 2, page 1566 (1975)] and disclosed recently in the U.S. Pat. No. 4,016,504 to Klauminzer (1977). These alternative beam expanders have been used with varying degrees of success but none of them could overcome all the disadvantages of the lens-telescope.

In another prior art dye laser described by Bjorkholm et al in *Optics Communications*, volume 4, page 283 (1971) a mirror-grating combination is used with the mirror mounted between the dye cell and the grating, but the linewidth obtained is poor.

It has been known for a long time that the wavelength selectivity of a diffraction grating may be improved by using a multiple-pass design. In the work of Hulthén and Lind in *Arkiv Fysik*, volume 2, page 253 (1950) a description is given of a spectrometer which utilises a combination of a grating and a plane mirror which reflects the beam diffracted by the grating back along its incidence path for a second diffraction by the same grating. The beam which travels away from the grating has, after the second diffraction, an angular dispersion of $$\frac{d\theta}{d\lambda} = \frac{2m}{a\cos\theta} \quad (3)$$

which is doubled as compared with Eq. (2). $\theta$ is the angle between the incident beam and the normal to the grating surface. This combination of grating and mirror has been used also in lasers for the same purpose of doubling the angular dispersion obtained.

Equations (2) and (3) express the well known feature of diffraction gratings that the higher the diffraction angle $\theta$ the higher is the angular dispersion obtained and the higher is the wavelength selectivity. However, the use of a diffraction grating in a Littrow mounting or in the arrangement described by Hulthén and Lind at an angle of incidence near grazing, e.g. 90° with respect to an axis normal to the surface of the grating, is not, insofar as is known, shown in the prior art. The use of a grating at angles of incidence exceeding 80° has been thought to be impractical because of the low diffraction efficiency and the high reflection losses at these angles.

X-ray spectroscopy is, insofar as is known, the only field in which diffraction gratings are presently used at grazing incidence angles, this being for reasons which are particular to x-rays, e.g. *Encyclopedia of Physics,* S. Flügge editor (Springer, Berlin, 1967) Volume 29, page 435. The grazing incidence diffraction of x-rays by optical gratings makes use of the fact that the refractive index of materials is generally slightly smaller than unity for x-rays, so that total reflection of x-rays occurs in the vicinity of grazing incidence. In fact, grazing incidence diffraction is the only known means for obtaining spectra at x-ray wavelengths. Another important difference between the diffraction of x-rays and the diffraction of light in grating tuned lasers in that in x-ray diffraction the incident beam and the diffracted beam are both at angles near grazing, but on opposite sides of the normal to the grating.

SUMMARY OF THE INVENTION

It is, accordingly, a principal object of the present invention to provide a wavelength selector, which does not require beam expansion, for use in tunable lasers. by eliminating the necessity for intracavity beam expansion the disadvantages of the prior art, as indicated above, are obviated.

This object is achieved according to the invention* by increasing the angular dispersion $d\theta/d\lambda$, of the beam returning from the grating to the excited medium instead of reducing $\delta\theta$ in Equations (2) and (3) above. In this way the passive bandwidth $\delta\lambda$ is reduced without using beam expansion. The increase in angular dispersion is obtained by using the combination of a diffraction grating mounted in the cavity at an angle near grazing incidence with respect to the beam travelling away from the excited medium, and a rotatable reflector which reflects the beam diffracted by the grating back along the path the light travelled to impinge upon the reflector. Wavelength tuning is provided by rotating the reflector while the grating remains fixed.

*"Narrowband Operation of a Pulsed Dye Laser Without Intracavity Beam Expansion", Shoshan et al, *Journal of Applied Physics,* Volume 48, No. 11, Nov. 1977, hereby incorporated by reference.

As will be described in more detail below, the present invention has an additional advantage in that bandwidth variation is provided by varying the angle of incidence of the beam on the grating.

BRIEF DESCRIPTION OF THE DRAWING

The invention will be more fully understood and appreciated from the following detailed description taken in conjunction with the drawing in which.

DETAILED DESCRIPTION OF THE PREFERRED EMBODIMENT

According to the invention, the wavelength selectivity obtained with a given diffraction grating is improved by mounting the grating in the cavity at an angle of incidence near grazing with respect to the beam travelling away from the excited medium, thereby illuminating the whole width of the grating. The use of the grating at grazing incidence in the Littrow mounting is possible but is accompanied by three difficulties:

1. Diffraction gratings blazed for angles above 80° are not available commercially today, unless diffraction from back facets is used.

2. When rotating the grating for tuning purposes, not only is the wavelength changed, but also the laser linewidth which depends strongly on $\theta$ as can be seen from the equations (1) and (2).

3. The direction of the zeroth order diffraction of the grating is changed when tuning the wavelength. If this beam is used as the output laser beam it should have a fixed direction.

Due to these difficulties it is suggested, according to the invention, to use as a wavelength selector the combination of grating and reflecting means described by Hulthen and Lind with the grating mounted at grazing angle with respect to the optical axis of the laser.

Figure 1:
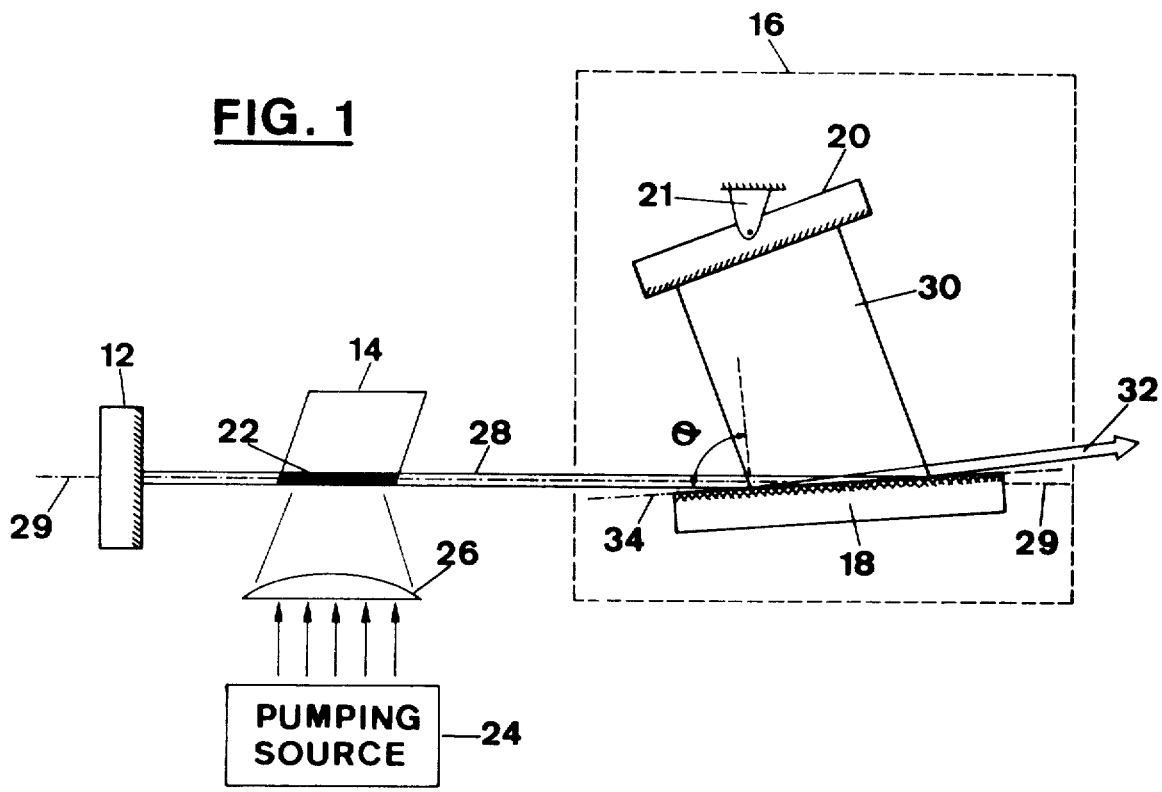
FIG. 1 is a schematic illustration of a wavelength selector constructed and operative in accordance with an embodiment of the invention disposed in a laser cavity.

FIG. 1 illustrates a wavelength selector according to this invention, mounted at one side of a tunable laser cavity. As an illustration of the invention, FIG. 1 refers to a side-pumped pulsed dye laser. The laser cavity includes a fixed reflecting means 12, a dye cell 14, and a wavelength selector 16 constructed and operative in accordance with an embodiment of the invention and comprising of a diffraction grating 18 and a reflecting means 20 such as a mirror or grating. The active medium 22 is excited in the dye cell 14 by the focussed radiation of the pumping source 24, the focussing being performed by the lens 26. The optical cavity is defined to be between the reflector 12 and the wavelength selector 16 with the active medium 22 and the intracavity beam 28 lying along an optical axis 29. More precisely, the laser cavity is defined by the reflector 12 and the reflecting means 20, which in the preferred embodiment are both totally reflecting plane mirrors. Mirror 20 is the tuning element of the wavelength selector and it is pivotally mounted—as illustrated schematically at 21—so that it may be rotated for wavelength tuning around an axis perpendicular to the plane of the drawing.

A portion 30 of the beam 28 incident on the grating 18 is diffracted in the direction of the rotatable mirror 20, while the remaining portion 32 of the beam is reflected out in the zeroth order of diffraction. In the preferred embodiment, this reflected portion 32 is used as the output beam of the laser. Due to the angular dispersion of the diffracted beam 30, only a narrow wavelength range is reflected by mirror 20 back along the direction of incidence of beam thereon, the wavelength depending on the orientation of the mirror 20 with respect to the grating 18. The back reflected beam 30 is diffracted again by the grating (in the same order as in the first diffraction) and is returned to the excited (active) medium 22. The zeroth order of this second diffraction is reflected out and is lost. The beam coming back into the excited medium has an angular dispersion $d\theta/d\lambda$ given by equation (3) where $\theta$ is the angle between the incident beam 28 and the normal to the grating, a is the groove-spacing of the grating, and m is the diffraction order.

The angular dispersion, $d\theta/d\lambda$, is twice as large as that obtained in the usual Littrow arrangement under the same conditions (assuming the same values for a, m and $\theta$). This increase in dispersion is due to the fact that the beam is diffracted twice before returning to the active medium. Thanks to the strong dependence of the dispersion on the angle $\theta$ as expressed by equation (3), a very high angular dispersion may be achieved when the grating is mounted near grazing, thereby achieving a narrow passive bandwidth. When the illumination is near grazing incidence, the whole width of the grating may be illuminated, thereby achieving the highest selectivity obtainable with the grating.

The wavelength selector 16 is mounted in the cavity in an autocollimation arrangement so that the beam travelling away from the wavelength selector towards the active medium is collinear with the beam 28 incident on the grating 18 along axis 29.

With the angular dispersion given by Eq. (3), the single-pass bandwidth of the cavity becomes, according to Eq. (1)

$$\delta\lambda = \frac{a\cos\theta}{m} \delta\alpha \quad (4)$$

The linewidth of the output beam is generally smaller than the passive bandwidth due to multiple-pass effect. To obtain a narrow bandwidth $\delta\lambda$, a highly dispersive grating should be used (which dictates a small value of a/m) and the angle $\theta$ should be as high as possible, that is as close to 90° as possible. $\theta$ is only limited by the grating width; thus, the grating should be large enough to intercept the beam completely at the desired angle of incidence.

The alignment of the cavity is very simple and no focusing is required. The cavity has low losses and may be shorter than one containing a telescope. Also the use of expensive lenses is eliminated.

Other special features of this arrangement are: 1. Narrow bandwidth. The highest selectivity obtainable with a given grating may be achieved, since all its grooves may be illuminated. 2. The cavity is free from any glass components apart from the dye cell itself. 3. The output coupling may be varied by varying $\theta$, since the intensity of zeroth order depends strongly on $\theta$. This enables matching of the cavity to the gain of the laser material. 4. The wavelength is tuned by rotating mirror 20. A large tuning range is obtained, and a linear wavelength readout is possible via a mechanical sine drive. 5. The cavity is short, and thus the laser efficiency is improved for a given pumping pulse duration. 6. Since only a narrow line on the grating is illuminated, the constraints on the grating rotation mechanism are less severe than in a cavity containing a telescope. 7. This cavity design permits a continuous bandwidth variation by varying the angle $\theta$ [see Eq. (4)].

As an illustration of the invention a nitrogen-laser-pumped dye laser was constructed, and operated successfully.

The grating 18 used was a 15 cm wide echelle grating made by Bausch & Lomb catalog No. 35.03-19-451 having 316 grooves per mm and a blaze angle of 63°26′. The fixed reflector 12 and the tuning reflector 20 were both aluminum coated mirrors with a reflectivity of about 90%. The use of dielectric coated mirrors would involve lower losses and is therefore preferred. The dye cell used was a Molectron model DL 051 cuvette, with a magnetic stirrer, filled with a solution of Rhodamine 6G in hexafluoroisopropanol ($2.5 \times 10^{-3}$ M). The focusing lens was a cylindrical quartz lens made by Oriel (U.S.A.) with a focus length of 50 mm. The length of the cavity was 25 cm (in another experiment a shorter cavity of 20 cm was used) when measured to the middle of the echelle 18. The nitrogen laser used for pumping was a home-made longitudinally excited laser operating at a repetition rate of 10 pps with 50 kW peak power and a pulse duration of 12 nsec (FWHM).

The grating 18 was used in the wavelength selector 16 in the strongest diffraction order at grazing incidence. It should be noted that the strongest order in the present arrangement will not be in general the same order which is strongest in a Littrow arrangement. When operating the laser near 5700 Å, the ninth order of the echelle was used, while in the Littrow arrangement the tenth order would have been indicated.

Since a grating 18 with many diffraction orders is used, undesirable direct feedback may occur when the equation for the Littrow arrangement ($2a \sin \theta = m\lambda$) is satisfied for an order higher than the one used. To prevent such an undesirable feedback, the grating 18 should be tilted a little around axis 34 defined by the intersection of grating's surface and the plane of the drawing. The grooves of the grating should remain however perpendicular to axis 34. If a grating 18 with a groove spacing satisfying $\frac{1}{2}\lambda < a < \lambda$ is used in first order, only a single diffraction order exists so that such a tilt is not necessary. A grating with such a groove spacing is preferred.

Another disadvantage of the high-order echelle compared with a grating which diffracts only one order is that a superposition of different orders at slightly different wavelengths is possible in the present arrangement. The beam, diffracted twice in the ninth order before returning to the active medium, may be overlapped by beams diffracted at other combinations of orders, such as (8+10) or (10+8). If this happens, the spectrum of the output beam 32 will contain several narrow lines. Such a superposition was prevented in the present example by using a small mirror 20, and by mounting it far enough from the grating 18, so that only a single combination of orders could exist.

The superfluorescent beam 28 incident on the grating 18 was diffraction limited, due to the large distance (45 mm) between mirror 12 and the active medium. The far-field divergence of this beam was measured and was found to be 2.3 mrad (half-angle). The large width of the echelle 18 made it possible to operate at an angle of incidence as high as 89°30′. At this angle, the calculated angular dispersion [Eq. (3)] was 65 mrad/Å and the corresponding single-pass bandwidth [Eq. (4)] was 0.07 Å. This compares favourably with the angular dispersion of 0.7 mrad/Å and the single-pass bandwidth of 6.5 Å obtained with the same echelle-grating operating at Littrow-mounting at tenth order of diffraction.

The typical peak power obtained with Rhodamine 6G was 4 kW in pulses of 4 nsec (FWHM). The linewidth was measured by photographing the fringes of a Fabry-Pérot interferometer with a free spectral range of 0.5 cm$^{-1}$ and was found to be 0.08 cm$^{-1}$ or a little less than 0.03 Å (near 5700 Å). The measured half-angle divergence of the output beam was about 1 mrad. A tuning range of about 400 Å was obtained by rotating mirror 20. The measured linewidth and divergence of the output beam 32 were found, as expected, to be smaller than the single-pass values ($\delta\lambda = 0.07$ A; $\delta\alpha = 2.3$ mrad). This indicated that several round trips were carried out in the cavity during excitation time by virtue of the short cavity. The shortness of the cavity was also responsible for the wide tuning range obtained despite the small amount of feedback from the grating 18.

The lasing efficiency, tuning range and output beam divergence of the dye laser tuned by the wavelength selector here described were similar to those of lasers fitted with intracavity beam expanders. But, in view of the advantages listed on pages 10–11 and especially the simplicity of the design, this invention seems to present an attractive alternative.

Since, as mentioned above, the use of a grating having a single order of diffraction is preferred, experiments were performed with two such gratings: a Bausch & Lomb model 35.53-05-290 having 1800 grooves per mm and a blaze angle of 26°45′; and a non-blazed holographic grating with 2000 grooves per mm made by Jobin-Yvon (France) catalog No. 100 HM23. Both satisfy the condition $\frac{1}{2}\lambda < a < \lambda$ for the wavelength range between 5600 Å and 7000 Å, and both operated successfully in the dye laser described above; the holographic grating showed superior performance by virtue of its higher diffraction efficiency.

The wavelength selector 16 may be used in a laser cavity without employing the reflected beam 32 as the output laser beam. Other output coupling techniques may be used, e.g. mirror 12 can be made partially transmitting to couple out the energy as in HUML /a/ nsch-type lasers. In such an arrangement, the output beam has the advantage of lower background of amplified spontaneous emission; however, the efficiency may be lower since the strong beam 32 reflected from the grating is lost.

An improvement in the wavelength selector 16 may be the use of a cylindrical mirror as the reflective means 20, with the axis of the cylinder lying in the plane of the drawing, in order to reduce radiation losses.

Figure 2:
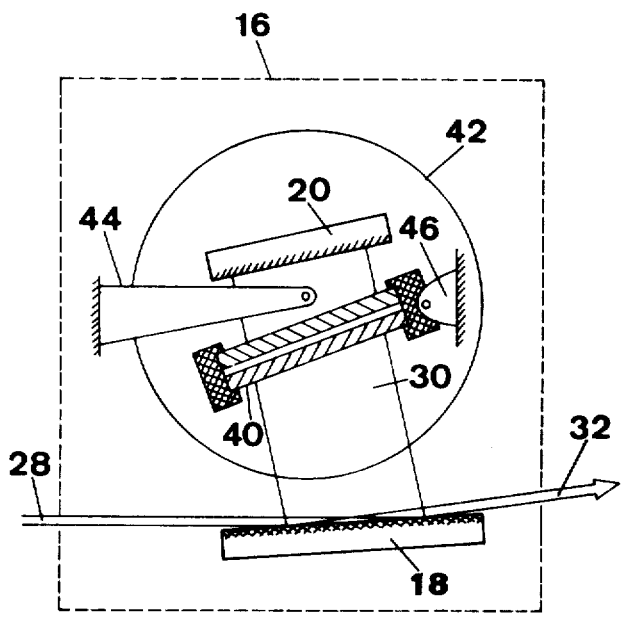
FIG. 2 is a schematic illustration of a modified form of wavelength selector constructed and operative in accordance with an embodiment of the invention.

Now, referring to FIG. 2, an improved wavelength selector 16 is shown with an etalon 40 introduced between the grating 18 and mirror 20. The etalon which may be a solid etalon or an air-spaced etalon provides a further line-narrowing. Walk-off problems are eliminated since the beam travelling through the etalon 30 is in general larger (in one dimension) than the beam 28. This fact also improves the wavelength selection contributed by the etalon due to the small divergence of the large beam 30. The assembly 42 of etalon 40 and mirror 20 must be mounted on a common pivotal mount which may be rotated as illustrated schematically at 44. Rotation of the assembly 42 provides coarse tuning (as when rotating only the grating in HUML /a/ nsch-type lasers), since the etalon orientation with respect to beam 30 is unchanged during rotation. Fine tuning (etalon tuning only) is achieved by rotating only the etalon 40 about a pivotal mount illustrated schematically at 46 while the common mount assembly 42 remains fixed.

For broadband fine tuning, both rotations relative to pivotal mounts 44 and 46 must be simultaneously performed. Alternatively, "pressure-tuning" as described by Wallenstein and HUML /a/ nsch in *Optics Communications* volume 14, page 353 (1975), may be used for the simultaneous tuning.

The etalon must be large enough to intercept the beam 30. An air-spaced etalon, Burleigh model VS-25 with the spacing adjusted to 5 mm was added to the wavelength selector described above with the holographic grating 18. The dye laser tuned by this wavelength selector was successfully operated.

Figure 3:
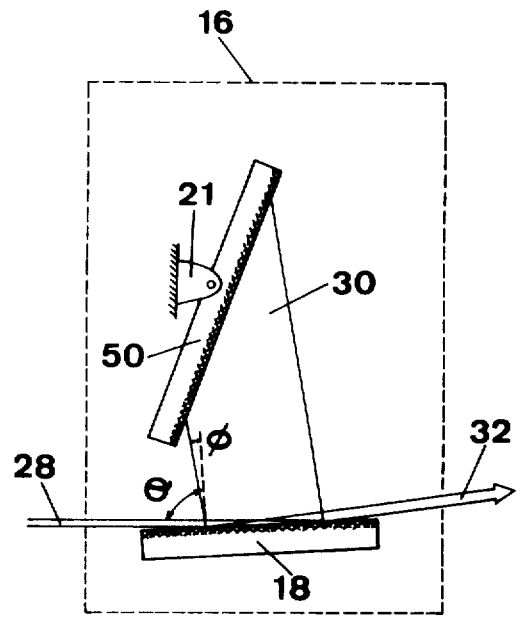
FIG. 3 is a schematic illustration of another modified form of wavelength selector constructed and operative in accordance with an embodiment of the invention.

FIG. 3 shows another improved wavelength selector, in which the reflecting means 20 in FIG. 1 is a second grating 50 which increases the wavelength selectivity. The grating 18 is in grazing incidence as before, while grating 50 is mounted in the conventional Littrow mounting with respect to the beam 30. In the arrangement of FIG. 3, grating 18 may be mounted at a smaller angle of incidence, and this can be of help if the use of small gratings is preferred. Also, a higher lasing efficiency is expected if the grating 18 is mounted at a less steep incidence angle since a higher diffraction efficiency is obtained. It should be noted that the gratings 18 and 50 must be mounted so that their relative orientation is as shown in FIG. 3 in order to achieve addition of the angular dispersions contributed by each of the gratings. Otherwise, the angular dispersions of the gratings may cancel each other. In this arrangement, grating 18 may be considered as a kind of beam expander which offers—in addition to angular dispersion—continuously variable one-dimensional beam expansion. The magnification factor is $M = \cos\phi/\cos\theta$, where $\phi$ is the angle between beam 30 and the normal to grating's surface; M may vary between 5 and 150 by varying $\theta$ (up to 89°40′ for most practical purposes). A dye laser was constructed in accordance with this design with a holographic grating 18 and echelle 50. The laser operated successfully with this improved wavelength selector and its performance was found to be similar to that of the laser constructed according to the design of FIG. 1.

Figure 4:
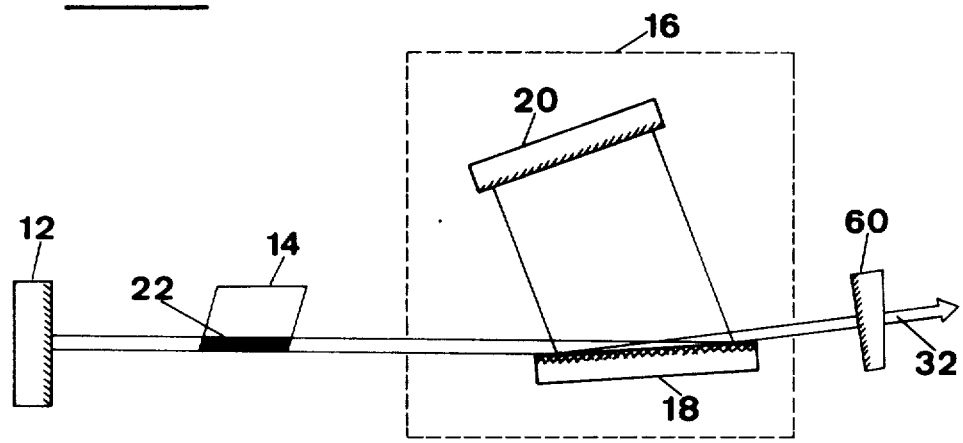
FIG. 4 is a schematic illustration of the location of a wavelength selector within a laser cavity in accordance with an embodiment of the invention.
Figure 5:
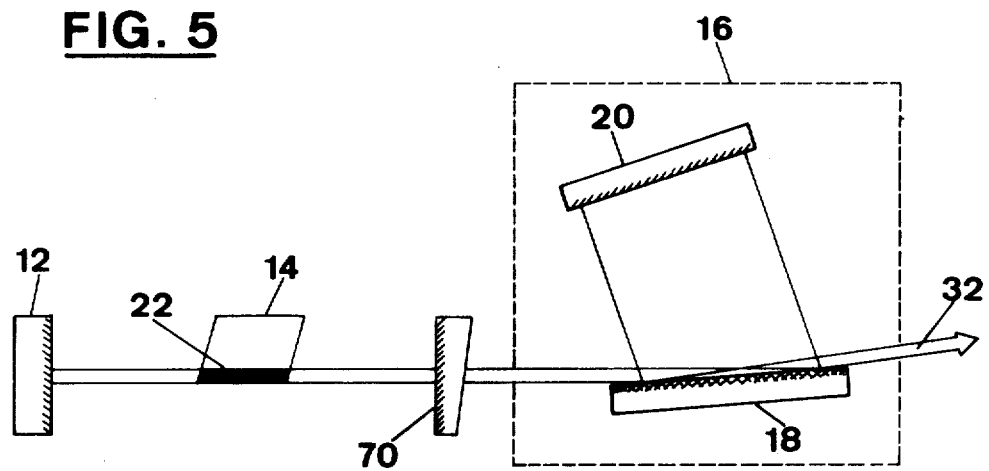
FIG. 5 is a schematic illustration of the location of a wavelength selector outside a laser cavity in accordance with an embodiment of the invention.

The wavelength selector 16 need not necessarily be the end element of the cavity as in the embodiment of FIG. 1. It may be introduced between the reflectors 12 and 60 which define the laser cavity as illustrated in FIG. 4. Alternatively, it may be mounted outside a cavity defined between two reflectors 12 and 70 as illustrated in FIG. 5 thereby forming a coupled resonator. The reflectors 60 in FIG. 4 and 70 in FIG. 5 may be, for example, a wedged quartz window which provides a reflection of about 4%. The arrangements illustrated in the FIGS. 4 and 5 may be useful in a laser having a relatively low gain in which a higher cavity Q-factor (i.e. smaller output coupling) is required.

The "grazing incidence" method here used is applicable to various cavity configurations, and the specific designs shown in FIGS. 1 to 5 are given only as an illustration of the possibilities. Other cavity configurations amenable to the method of the invention are a ring-laser cavity or a longitudinal pumping arrangement. Also, other output coupling techniques may be used. Due to the possibility of controlling the output coupling, optimum operation may be obtained with different laser materials. The invention seems to be applicable to different types of lasers and in different applications as well as in spectrometers and parametric oscillators.

It will be obvious to those skilled in the art that various changes may be made without departing from the scope of the invention and the invention is not to be considered limited to what is shown in the drawing and described in the specification.

What is claimed is:

1. A wavelength selector comprising:
   a diffraction grating disposed at a grazing angle to an incident beam of light; and
   first reflecting means disposed so as to receive a dispersive beam of light diffracted from said grating at a non-zero diffraction order along a reflection path angled with respect to said incident beam of light and to reflect it back to said grating in an opposite direction along said reflection path, thereby to provide a second diffraction of said incident beam.

2. A wavelength selector according to claim 1 and wherein said first reflecting means is rotatably mounted for providing selectable wavelength tuning.

3. A wavelength selector according to either of claims 1 or 2 wherein said grating is an echelle grating.

4. A wavelength selector according to claim 1 in association with second reflecting means so as to define a laser cavity between said second reflecting means and said first reflecting means.

5. Apparatus according to either claim 1 or claim 4 wherein said first reflecting means comprises a grating.

6. Apparatus according to either claim 1 or claim 4 wherein said first reflecting means comprises a mirror.

7. Apparatus according to either claim 1 or claim 4 and also comprising an etalon disposed intermediate said diffraction grating and said first reflecting means.

8. A laser including as its resonant cavity the device of claim 4 and wherein said diffraction grating is disposed such that the zero order of diffraction thereof provides a laser output.

9. A laser including as its resonant cavity the device of claim 4 and wherein said second reflecting means is arranged so as to couple out laser energy from said laser cavity.

10. A device including a laser and a wavelength selector according to claim 1 and wherein said diffraction grating is disposed to receive an incident beam of light from a laser cavity of said laser and is located outside the laser cavity.

11. A device including a laser and a wavelength selector according to claim 1 and wherein said diffraction grating is disposed to receive an incident beam of light from a laser cavity of said laser and is located therewithin.

12. A wavelength selector comprising:
   a diffraction grating disposed at a grazing angle to an incident beam of light; and
   first reflecting means disposed so as to receive a diffracted beam of light from said grating and to reflect it back to said grating, thereby to provide a second diffraction of said incident beam,
   said first reflecting means comprising a cylindrical mirror.

13. Laser apparatus including a wavelength selector comprising:
   a diffraction grating disposed at a grazing angle to an incident beam of light;
   first reflecting means comprising a cylindrical mirror and disposed so as to receive a diffracted beam of light from said grating and to reflect it back to said grating, thereby to provide a second diffraction of said incident beam; and
   second reflecting means associated with said first reflecting means so as to define a laser cavity between said first and second reflecting means.

14. A wavelength selector comprising:
   a diffraction grating disposed at a grazing angle to an incident beam of light;
   first reflecting means disposed so as to receive a diffracted beam of light from said grating and to reflect it back to said grating, thereby to provide a second diffraction of said incident beam,
   said first reflecting means being rotatably mounted for providing selectable wavelength tuning, and
   mounting means fixed with respect to said first reflecting means for rotation together therewith and an etalon disposed intermediate said diffraction grating and said first reflecting means and rotatably mounted onto said mounting means.

15. Laser apparatus including a wavelength selector comprising:
   a diffraction grating disposed at a grazing angle to an incident beam of light;
   first reflecting means disposed so as to receive a diffracted beam of light from said grating and to reflect it back to said grating, thereby to provide a second diffraction of said incident beam, said first reflecting means being rotatably mounted for providing selectable wavelength tuning;
   mounting means fixed with respect to said first reflecting means for rotation together therewith and an etalon disposed intermediate said diffraction grating and said first reflecting means and rotatably mounted onto said mounting means; and
   second reflecting means associated with said first reflecting means so as to define a laser cavity between said first and second reflecting means.

* * * * *